United States Patent [19]

Liu et al.

[11] 4,118,877
[45] Oct. 10, 1978

[54] EDUCATIONAL TOY

[76] Inventors: Hsing Ching Liu; Lan-dih Liu, both of 3F, No. 213, Chung Ching N. Rd., Sec. 4, Taipei, Taiwan

[21] Appl. No.: 802,949

[22] Filed: Jun. 2, 1977

[51] Int. Cl.² .............................................. G09B 3/00
[52] U.S. Cl. .................................................... 35/9 R
[58] Field of Search ...................... 35/9 R, 9 B, 22 R; 273/1 M

[56] References Cited

U.S. PATENT DOCUMENTS

| 126,761 | 5/1872 | Unna | 35/9 R |
|---|---|---|---|
| 317,365 | 5/1885 | Jacobs | 35/9 R |
| 2,295,452 | 9/1942 | Deaton | 273/1 M UX |
| 2,956,807 | 10/1960 | Luchsinger | 273/1 M |
| 3,114,547 | 12/1963 | Joslyn | 273/1 M |
| 3,380,176 | 4/1968 | Kling et al. | 35/9 R |
| 3,758,693 | 9/1973 | Ebert | 35/22 R X |
| 3,994,078 | 11/1976 | Liu | 35/9 B |

Primary Examiner—William H. Grieb

[57] ABSTRACT

An educational toy comprises in combination a base, a pair of boards and a series of replaceable quiz-and-answer plates. The base has a central spindle. The boards and one of said plates are superimposed over said base. Each board is provided with one groove which is curved in opposite directions between the two boards in such a way that a crossover is formed. A magnet is buried in said crossover. There are various well-designed representations on each plate. An indicator is displaceable over said plate to indicate whether the selected answer is correct or wrong.

9 Claims, 6 Drawing Figures

Fig. 3
Fig. 4
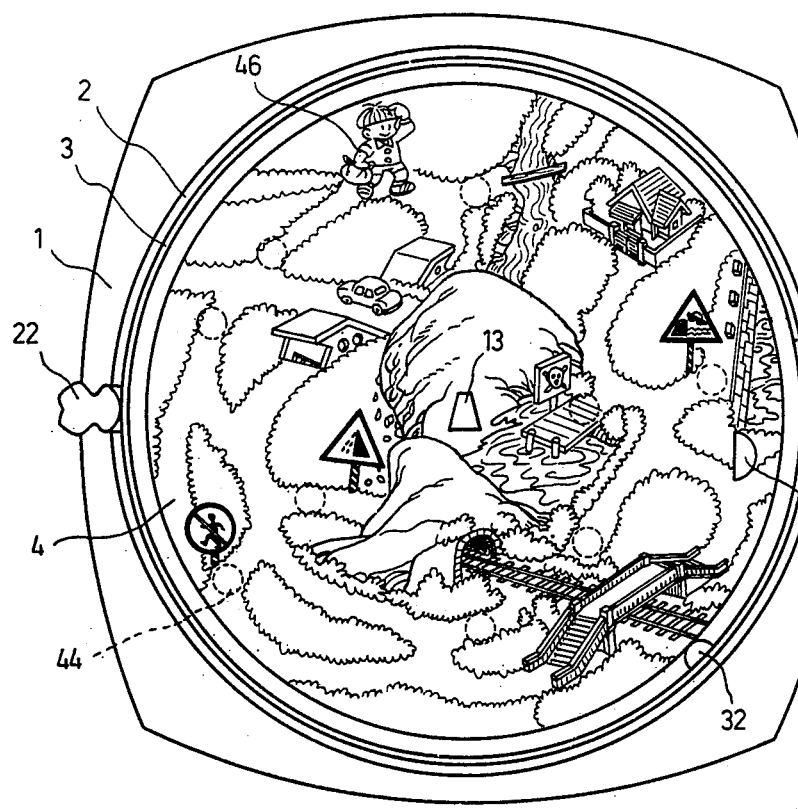
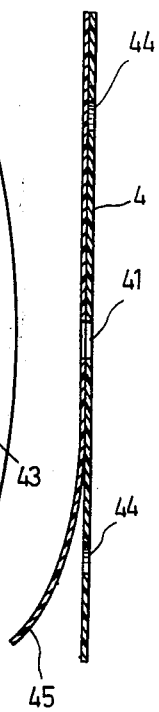
Fig. 5
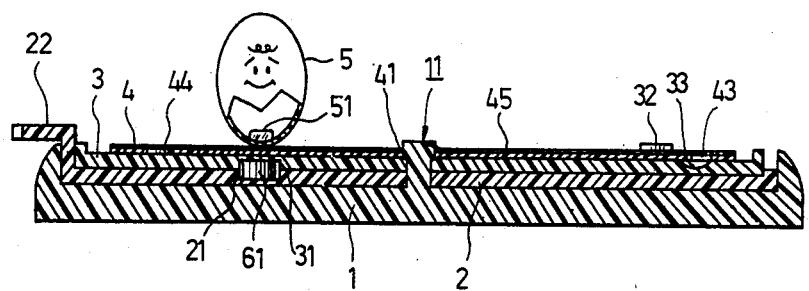
Fig. 6
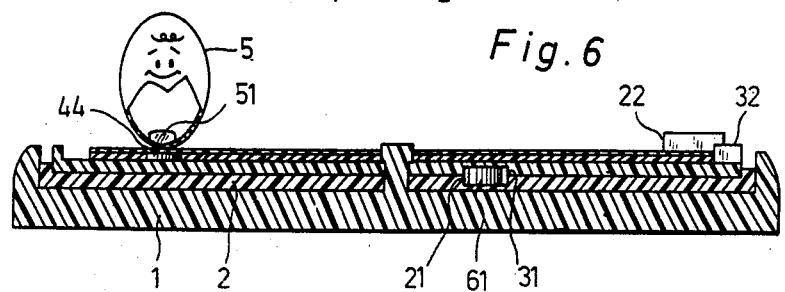

EDUCATIONAL TOY

The present invention relates to an educational toy.

In the U.S. Pat. No. 3,994,078 issued Nov. 30, 1976 to Hsing-Ching Liu, one of the present joint inventors, there is disclosed an educational toy clock mainly comprising a base, an active statue mounted on the base, a series of replaceable quiz-and-answer plates, an electrical conducting disc, a couple of fingers and corresponding switch boards, a plurality of driving means and the relevant mechanism, and a couple of signal circuits, which is characterized by the fact that when a correct answer is made by turning the fingers above the quiz-and-answer plate, a circuit is closed to move a driving means for actuating first mechanism within the statue to indicate approval by nodding and simultaneously clapping. On the other hand, when a wrong answer is made, a circuit is otherwise closed to move another driving means for actuating a second mechanism within the same statue to indicate disapproval by wagging the head.

But this toy clock has various disadvantages, such as complicated structure, battery actuation, large size, high manufacturing cost and the like.

The main object of this invention is to provide a novel educational toy with simple construction, without the necessity of an electrical power source and complicated mechanisms, thus compact size and low cost can be positively ensured.

The educational toy according to the present invention comprises a base provided at about the center thereof with a spindle having a cylindrical stem portion and a non-circular cross-section head portion; a pair of boards superimposed over said base by inserting through a hole at the center of each board said spindle and retained at said stem portion thereof, wherein the lower board is formed on the top surface thereof with an upwardly opened groove curved in one horizontal direction, while the upper board similarly is formed on the bottom surface thereof with a downwardly opened groove curved in another horizontal direction, in such way that a crossover is formed by said two grooves, and a magnet free-movably buried in said crossover; a series of replaceable quiz-and-answer plates selectively mountable over said upper board, each plate being provided with a corresponding non-circular cross-section hole at the center thereof for snapping on said head portion of said spindle, the plate having well-designed representation thereon for selecting answers to attain the educational purposes; and a movable indicator displaceable over said plate and containing a magnet, thereby utilizing the attraction between said magnet and the magnet buried inside said crossover to indicate whether the answer selected is correct or wrong.

The invention will be further described, by way of example only, with reference to the accompanying drawings, in which:

FIG. 3 is a top view of a second embodiment of the present invention;

FIG. 4 is a sectional view of the quiz-and-answer plate with magnets embedded therein and an outer layer attached at one side of said plate;

FIG. 5 is a sectional view of the second embodiment illustrating the state when the magnet buried inside the crossover attracts the indicator; and FIG. 6 is a similar sectional view but illustrating the state when said magnet departs from the indicator.

Figure 1:
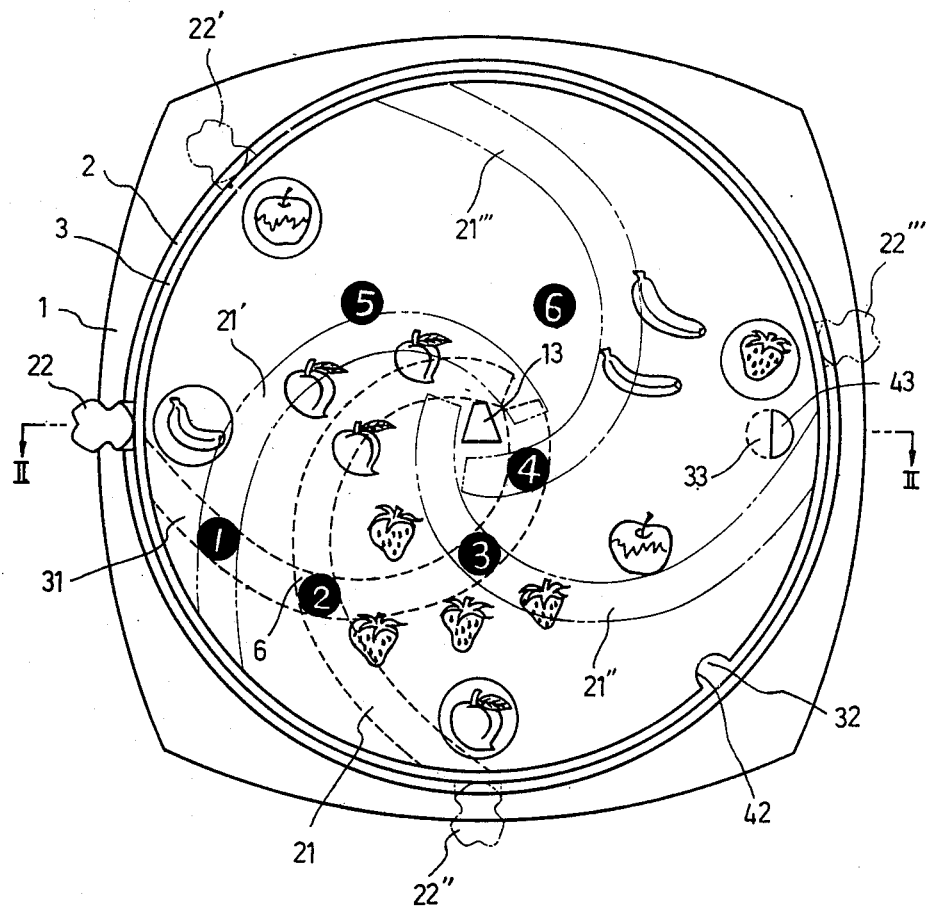
FIG. 1 is a top view of a first embodiment of the present invention.
Figure 2:
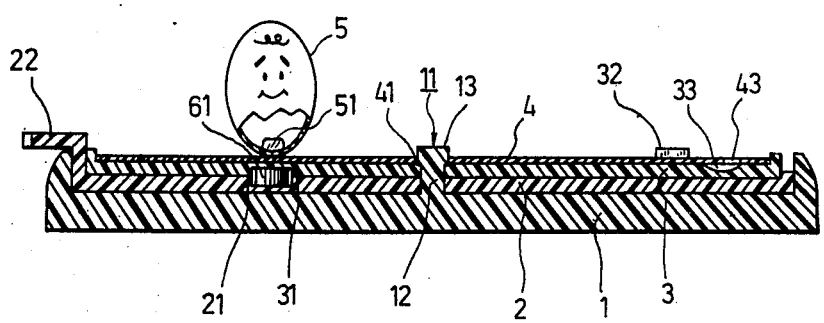
FIG. 2 is a cross-sectional view taken along the line II — II in FIG. 1, with the indicator partly broken away.

Now, with reference to FIGS. 1 and 2, the educational toy according to the present invention mainly comprises a base 1, a pair of boards 2 and 3, a plate 4 and an indicator 5. The base 1 can be any configuration and not restricted to that as shown. The base 1 forms a cavity in the central portion and provides a spindle 11 at about the center. The spindle 11 consists of a cylindrical stem portion 12 and a non-circular cross-section head portion 13, which is preferably of tetrahedral shape as best shown in FIG. 1, but not limited thereto.

The lower board 2 is placed over said base 1 by inserting through a hole at the center of said board 2 said spindle 11 and retained at said stem portion 12. On the top surface of said lower board 2 there is provided an upwardly opened groove 21 (FIG. 2) which is curved in one horizontal direction (FIG. 1). The lower board 2 at its periphery has a protruding operating means 22 which can be operated to turn the board 2 angularly relative to said base 1 and upper board 3.

The upper board 3 is further placed over said lower board 2, also by inserting through a hole at the center of said board 3 the same spindle 11 and also retained at said stem portion 12. Therefore, the height of said stem portion 12 is about equal to the total thickness of both lower and upper boards 2 and 3. On the bottom surface of said upper board 3 there is also provided a groove 31 but downwardly opened (FIG. 2). Said groove 31 is curved in another horizontal direction opposite to the direction of the afore-mentioned groove 21, as best shown in FIG. 1, in such way that a crossover 6 is formed by said two grooves 21 and 31. The upper board 3 at its periphery has a raised setting means 32 for setting the board 3 at a predetermined angular position relative to the plate 4, as will be described hereinafter. On the top surface of the board 3 there is a recess 33 for easy insertion and removal of said plate 4 by hand.

The replaceable plate 4 is printed with well designed quiz-and-answer representation. The plate 4 at the center thereof is punched to form a non-circular cross-section hole 41 in the shape corresponding to that of said head portion 13 of the spindle 11, so that the plate 4 can be readily snapped on the spindle 11 and fixed at the head portion 13. The plate 4 has a notch 42 to match with the setting means 32 of the upper board 3, so that the angular position of said board 3 and accordingly of said groove 31 will be set and varied in accordance with the different positions of notches 42 on various plates 4. The plate 4 has an opening 43 at a location corresponding to said recess 33 on the upper board 3.

A magnet 61 is buried within said crossover 6 formed by the two grooves 21 and 31, as shown in FIG. 2. The magnet 61 is freely movable along the changing orbit of said crossover 6 and preferably in a cylindrical shape with the height at least greater than the depth of grooves 21 or 31 but less than the total depth of grooves 21 and 31.

An indicator 5 containing a magnet 51 can be moved as desired all over the plate 4. The indicator 5 is preferably in such shape, for example, oval shape, that when the indicator 5 is moved to meet the point that said crossover 6 is located, then the magnet 51 in the indicator 5 will be attracted by the magnet 61 buried within said crossover 6, so that the indicator 5 stands still.

Otherwise when the hand to move said indicator 5 releases, the indicator 5 will fall down due to lack of attraction between both magnets 51 and 61.

With the construction mentioned above the present invention can be operated by turning the operating means 22 to change the position of said crossover 6, i.e. the relative position between the two grooves 21 and 31. Since the upper board 3 is fixedly set by matching the setting means 32 thereof with the notch 42 provided on the periphery of said plate 4, the groove 31 is also fixed. But the position of the groove 21 can be varied by turning said operating means 22. In this way, the crossover 6 will run from time to time along an orbit defined by the groove 31 with the operating means 22 turning.

Considering the plates as shown in FIG. 1, for example, there are various fruits including banana, apple, peach and strawberry in different number for counting, but the one within the circle adjacent to the circumference of said plate 4 is for indication of the question and is excluded accordingly. There are also numeral selective answers "1" "2" "3" and "4" appearing on the plate 4 just above the invisible orbit of said crossover 6, namely, the path of the groove 31. The additional numbers "5" and "6" located out of the orbit are always incorrect answers.

Now, turning for example the operating means 22 to the position marked with 22 directed to the illustration of banana in the circle, this means to ask "how many bananas are shown?" The groove 21 is displaced to that position as shown. And the crossover 6 together with the magnet 61 therein is moved to the location just beneath the selective answer in numeral "2". If the child places the indicator 5 on the answer "2", then the magnet 51 will be attracted by the magnet 61, so that the indicator 5 will stand still. This means the answer is correct. If he places the indicator 5 on another numeral answer the indicator 5 will fall down. Next, turning the operating means 22 to the positions marked 22', 22" and 22''' in order, then the groove 21 will be moved to the positions as indicated by 21', 21" and 21''', respectively. The locations of said crossover are changed to that just beneath the selective answer "1" "3" and "4", respectively. The plate 4 is subsequently replaced, so unlimited questions and answers can be made.

In a second embodiment as shown in FIG. 3, the plate 4 has no notch along the periphery, so that the setting means 32 is free to turn in the same way as the operating means 22. Under this condition, the crossover 6 can be moved to any point by turning both operating means 22 and setting means 32, without any fixed orbit.

In this embodiment, the plate 4 has a plurality of magnets 44 embedded therein, see FIG. 3. If necessary, an outer layer 45 of printed material may be attached on either side or both sides of said plate 4 to retain said magnets 44. The plate 4 has for example the illustration to shown how the boy 46 takes the right way to go home, as better shown in FIG. 3. The magnets 44 embedded in the plate 4 are arranged to block the wrong way that the boy 46 should not take.

At the beginning, both the operating and setting means 22 and 32 are set at the starting points as shown. The crossover 6 is located at the place that the boy 46 stands, and the indicator 5 put thereon. Then, the player turns both means 22 and 32 freely to guide by means of the attraction between both magnet 51 and 61 (FIG. 5) the indicator 5 representing the boy 46 to go the right way according to the judgement of said player. He should avoid the indicator 5 meeting any one of the invisible magnets 44. As soon as the indicator 5 comes to the place that a magnet 44 is embedded, as shown in FIG. 6, that means he is going the wrong way. The magnet 51 inside the indicator 5 will then turn upside down under attraction by the magnet 44, and at the same time the magnet 61 will be repelled. When the player continues to turn either one or both means 22 and 32, since the attraction between magnets 51 and 61 has been interrupted, the indicator 5 stands still by attraction of magnet 44 and is not moved with the magnet 61. Under this condition, the player has failed so he must turn both means to the original start point and take the indicator back to the place that the boy 46 stands, and then start again.

The base 1, boards 2 and 3 and indicator 5 can be made of plastics and plate 4 made of printable material, such as card board or composed of a paper layer and a substrate. But the material is not a critical factor and may not be restricted thereto.

Further, the combination among all components can be varied. For example, the lower board 2 may be provided with a sleeve (not shown) at the center thereof, said sleeve being supported over said spindle 11. In turn, the upper boards 3 may be inserted at a central hole over said sleeve. And the top end of said sleeve may be formed with at least one protrusion to match with the opening or openings (not shown) punched adjacent the non-circular central hole on said plate 4.

The above embodiments are given only for illustrative purposes and not by the way of limitation. Any modifications evident to those skilled in the art will fall within the scope of the attached claims.

What we claim is:

1. An educational toy comprising:
    a base provided with a spindle at about the center thereof, the spindle consisting of a cylindrical stem portion and a non-circular cross-section head portion;
    a pair of boards superimposed over said base by inserting through a hole at the center of each board said spindle and retained at said stem portion thereof, wherein the lower board is formed on the top surface thereof with an upwardly opened groove curved in one horizontal direction, while the upper board similarly is formed on the bottom surface thereof with a downwardly opened groove curved in another horizontal direction, in such a way a crossover is formed by said two grooves, and a magnet free-movably buried in said crossover;
    a series of replaceable quiz-and-answer plates selectively mountable over said upper board, each plate being provided with a corresponding non-circular cross-section hole at the center thereof for snapping on said head portion of said spindle, the plate having well designed representation thereon for selecting answers to reach the educational purposes; and
    a movable indicator displaceable over said plate and containing a magnet, thereby utilizing the attraction between said magnet and the magnet buried inside said crossover to indicate whether the answer selected is correct or wrong.

2. A toy as claimed in claim 1, wherein the upper board has a setting means matching a notch on said plate to fix the position of said upper board angularly relative to said plate.

3. A toy as claimed in claim 1 wherein the lower board has an operating means to turn said lower board and vary its position angularly relative to both said base and said upper board, and thus change accordingly the position of said crossover formed by said two grooves on said lower board and said upper board.

4. A toy as claimed in claim 1 wherein the magnet buried in the crossover formed by said two grooves is preferably of a cylindrical shape with a height at least greater than the depth of any one of said grooves but less than the total depth of said two grooves.

5. A toy as claimed in claim 1 wherein the upper board has a recess on its top surface for easy removal of said plate.

6. A toy as claimed in claim 1 wherein the plate has a notch at its outer periphery.

7. A toy as claim in claim 1 wherein the plate is embedded with at least one magnet.

8. A toy as claimed in claim 7 wherein the plate may be attached with an outer layer at either side or both sides thereof.

9. A toy as claimed in claim 1 wherein the indicator is preferably of an oval shape.

* * * * *